Feb. 5, 1952 — N. J. L. SANDSTRÖM — 2,584,741

ADJUSTABLE GAUGE

Filed June 22, 1945

Inventor:
Nils Johan Ludvig Sandström
by his Attorneys
Howson & Howson

Patented Feb. 5, 1952

2,584,741

UNITED STATES PATENT OFFICE 2,584,741

ADJUSTABLE GAUGE

Nils Johan Ludvig Sandström, Goteborg, Sweden, assignor to SKF Industries, Inc., Philadelphia, Pa., a corporation of Delaware Application June 22, 1945, Serial No. 601,040
In Sweden April 26, 1944

Section 1, Public Law 690, August 8, 1946
Patent expires April 26, 1964

2 Claims. (Cl. 33—163)

The present invention relates to an adjustable gage, which is primarily intended for use in checking snap gages, but which can also be used for internal gaging. The usual method of checking snap gages has been to use fixed reference gages, for instance discs or rings, of which three are required for each tolerance on each nominal dimension. In order to provide a complete check on the snap gage one reference gage is required for the maximum limit, another for checking the minimum limit to which the gage is to be adjusted and a third, which shows, when the maximum limit of this snap gage has been worn so much that a new adjustment is required. A relatively great number of tolerances are used in connection with each nominal dimension and consequently a considerable number of fixed reference gages are required. Since this considerable number must be multiplied by the number of different nominal dimensions in use, it is apparent that this system for checking snap gages requires a very great stock of reference gages.

The present invention has for its purpose to considerably restrict the number of reference gages required by providing an adjustable gage which is adjustable within certain limits and which is provided with exchangeable parts, so that it can be used for checking a greater number of dimensions.

Figure 1:
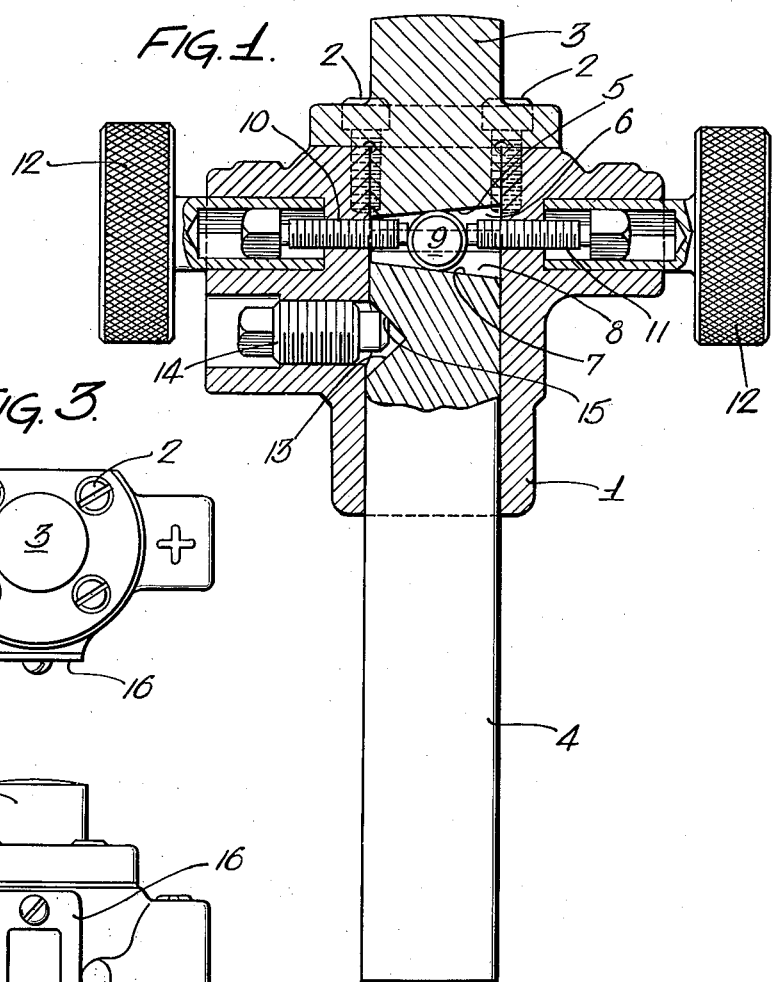
Figure 3:
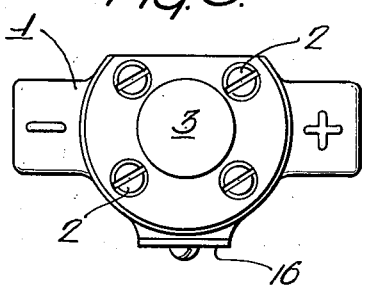
Figure 2:
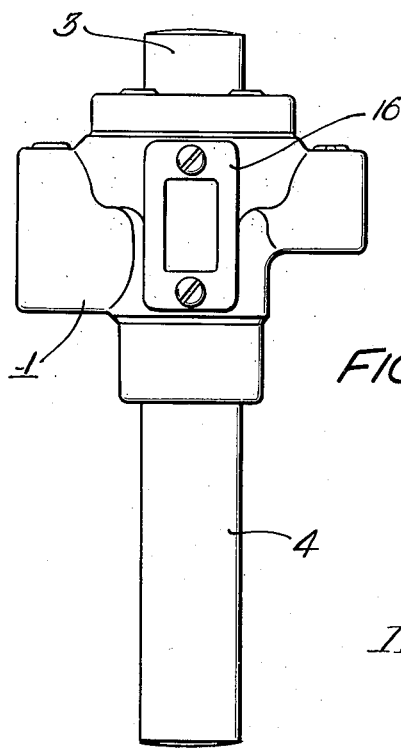

An embodiment of the gage according to the invention is illustrated on the accompanying drawing in which Fig. 1 shows a view partly in section of the gage and Fig. 2 shows an external side view on a smaller scale. Fig. 3 is an end view of the gage.

The gage has a body 1, to which a contact member 3 is attached by means of screws 2. Another contact member 4 is adjustably movable in the body 1, in which it fits very exactly so that all movement, except that along its axis, is prevented. A groove is formed across the inner end of the contact member 3 the bottom 5 of which is oblique relative to the axis of the contact member. At each side of the groove is a flange 6. Across the inner end of the contact member 4 is a similar groove having an oblique bottom plane 7, there being a flange 8 at each side of the groove. A roller 9 is disposed in the two grooves, the length of the roller being such that it is accurately guided by the flanges thereby preventing the roller from skewing relative to the bottom planes of the grooves. Opposed screws 10 and 11 are provided at either side of the body 1 having their axes perpendicular to the axis of the roller. The projecting parts of the screws are located in recesses in the body of the gage and the screws are therefore protected from inadvertent blows, which would disturb the adjustment of the gage. The recesses also serve as sockets for detachable keys 12 by means of which the screws 10 and 11 may be adjusted.

In the gaging member 4 is provided a conical recess 13 to engage with a screw 14 in the body 1. The basic form of the end 15 of the screw 14 is a conoid. The screw 14 is so located that its forward end always engages the upper part of the surface of the conical recess 13. When the screw is tightened it will tend to force the contact member 4 in a direction toward the roller 9.

The contact members 4 are made in series of varying lengths so that the gage can be altered for gaging different nominal dimensions. The gaging member 3 on the other hand is not changed. All gaging members 4 included in the same series are made with the same spherical, cylindrical or plane end surface as the gaging member 3, the radius of curvature of which is somewhat less than the radius of the smallest cylinder to be gaged with the contact member series in question. The range of the sizes in each series will vary with the diameter, for example the gage illustrated in drawing will cover all sizes over 95 mm. up to and including 115 mm. On one side of the body is a detachable frame 16 under which a piece of paper may be inserted upon which has been noted the true dimension to which the gage has been adjusted.

The whole range, which can be obtained by displacing the roller across the grooves may for instance be 1½ mm. whereby it is possible to obtain all dimensions and tolerances within the range for which the gage is desired by providing different gaging members 4 of sizes increasing by increments of 1 mm. Relative rotation between the gaging members 3 and 4 is prevented by the contact between the ends of the roller 9 and the flanges 6 and 8. All risk that the roller may assume a skewed position and thereby cause an alteration in the dimension is therefore eliminated.

The gage is adjusted in the following manner. After mounting the proper contact member 4 for the desired nominal dimension in the body 1, so that it is in firm contact with the roller 9 and after having positioned the keys 12 on the screws 10 and 11 the gage is introduced under a sufficiently sensitive gaging instrument. By retracting one of the screws 10 and 11 and tightening the other the roller is moved either to the left or to the right along the grooves 5 and 7 depending upon whether the distance between the ends of the contact members 3 and 4 is to be increased or decreased to obtain the desired tolerance on the nominal dimension. The plus and minus directions are indicated by signs on the body. It is preferable that the adjustment be made from a smaller dimension to a greater one i. e. in the plus direction. When the desired adjustment, as shown by the gaging instrument, has been obtained, the screws 10 and 11 are tightened so that the roller is firmly held between them in the desired position. The same key can then be used to tighten the screw 14 so that its conical end presses against the conical surface of the recess 13 and presses the contact member 4 into engagement with the roller. The gage is now adjusted to the correct dimension and when the keys have been removed all possibility of unintentional alterations in its dimension have been excluded. The nominal dimension of the tolerance to which the gage has been adjusted is noted on a piece of paper, which is fastened under the frame 16 after which the gage is ready for use.

The scope of the invention is not limited to the embodiment shown in the drawing. A ball or any other suitable body may be used instead of the roller 9. This body need not necessarily be round but may have any other suitable shape, such as a wedge or the like. One of the grooves may be perpendicular on the axis of the contact members, in which case the obliquity of the other groove must be increased in a corresponding degree.

Having thus described my invention, I claim and desire to secure by Letters Patent the following:

1. An adjustable gage comprising a body and a pair of contact members mounted in and projecting from said body with the inner end of one of said members in opposed relation to the inner end of the other, one of said contact members being adjustable relative to the body, a groove extending across the inner end of each of the contact members with the planes of the bottom surfaces of the grooves angularly disposed with respect to each other, an adjusting member interposed between the inner ends of the contact members and movable in and longitudinally of said grooves in engagement with said bottom surfaces and in guiding contact with the side walls of said grooves, means for positively shifting the adjusting member along the grooves, and locking means for said adjustable contact member, said locking means being arranged to exert pressure on the adjustable contact member in a direction to urge the member towards the adjusting member whereby the position of the adjustable contact member is determined conjointly by the locking means and the adjusting member.

2. An adjustable gage according to claim 1 wherein the adjusting member is in the form of a roller, the cylindrical surface of the roller engaging the bottom surfaces of the grooves and the ends of the roller being accurately guided by the sides of the grooves so as to prevent the roller from skewing relative to the bottom planes of the grooves.

NILS JOHAN LUDVIG SANDSTRÖM.

REFERENCES CITED

The following references are of record in the file of this patent:

UNITED STATES PATENTS

| Number | Name | Date |
|---|---|---|
| 1,300,841 | Johansson | Apr. 15, 1919 |
| 1,367,537 | Daniels | Feb. 8, 1921 |
| 1,420,951 | Bartholdy | June 27, 1922 |
| 1,574,735 | Paloski | Feb. 23, 1926 |
| 1,658,994 | Lauer | Feb. 14, 1928 |
| 1,671,168 | Steinle | May 29, 1928 |
| 2,085,380 | Muller | June 29, 1937 |

FOREIGN PATENTS

| Number | Country | Date |
|---|---|---|
| 17,654 | Sweden | May 28, 1904 |
| 110,463 | Great Britain | Oct. 25, 1917 |